(12) United States Patent
Fiordelisi

(10) Patent No.: US 6,435,407 B1
(45) Date of Patent: Aug. 20, 2002

(54) COMPUTERIZED SHOPPING CART WITH STORAGE AND DISTRIBUTION SYSTEM, FOR SUPERMARKET USE

(76) Inventor: Luigi Fiordelisi, Via Valle d'Aosta, 3, Sc.2/Pal.a, 00048 Nettuno (RM) IT (IT)

( * ) Notice: Subject to any disclaimer, the term of this patent is extended or adjusted under 35 U.S.C. 154(b) by 0 days.

(21) Appl. No.: 09/194,026

(22) PCT Filed: Mar. 23, 1998

(86) PCT No.: PCT/IT98/00067
§ 371 (c)(1),
(2), (4) Date: Nov. 19, 1998

(87) PCT Pub. No.: WO98/42239
PCT Pub. Date: Oct. 1, 1998

(30) Foreign Application Priority Data

Mar. 25, 1997 (IT) ...................................... RM97A0165
Mar. 5, 1998 (IT) ...................................... RM98A0129

(51) Int. Cl.⁷ ............................................... G06K 15/00
(52) U.S. Cl. ........................................ 235/383; 235/431
(58) Field of Search ................................. 235/383, 431, 235/472.01, 472.02, 462.13

(56) References Cited

U.S. PATENT DOCUMENTS 4,071,740 A * 1/1978 Gogulski ..................... 235/431
5,418,354 A * 5/1995 Halling et al. .............. 235/383
5,426,423 A * 6/1995 Raimbault et al. ...... 235/472 X

FOREIGN PATENT DOCUMENTS

JP 05081559 * 4/1993

* cited by examiner

*Primary Examiner*—Karl D. Frech
(74) *Attorney, Agent, or Firm*—Browdy and Neimark, P.L.L.C.

(57) ABSTRACT

A system including a computerized shopping cart that includes a closed mechanical cart (1) which interconnects/disconnects to units for the insertion/storage of products upon manual command managed by a shopping computer aimed at managing shopping problems and controlling all electronic functions, i.e. automatic system for optically scanning (7) bar codes (UPC/EAN standard), one for checking (8) the correctness of the customer's operations, one emitting the intelligent multimedia commercial message, one for the wireless exchange of data with the outside, for use in supermarkets. The system provides shopping info (8) (list of products on sale, location, price, other), or of the product being purchased (price, whether it is on sale, partial groceries bill), or already purchased (list of purchased items) or to be purchased (remaining shopping list), guided by appropriate interactive messages (acoustic, visual.

19 Claims, 15 Drawing Sheets

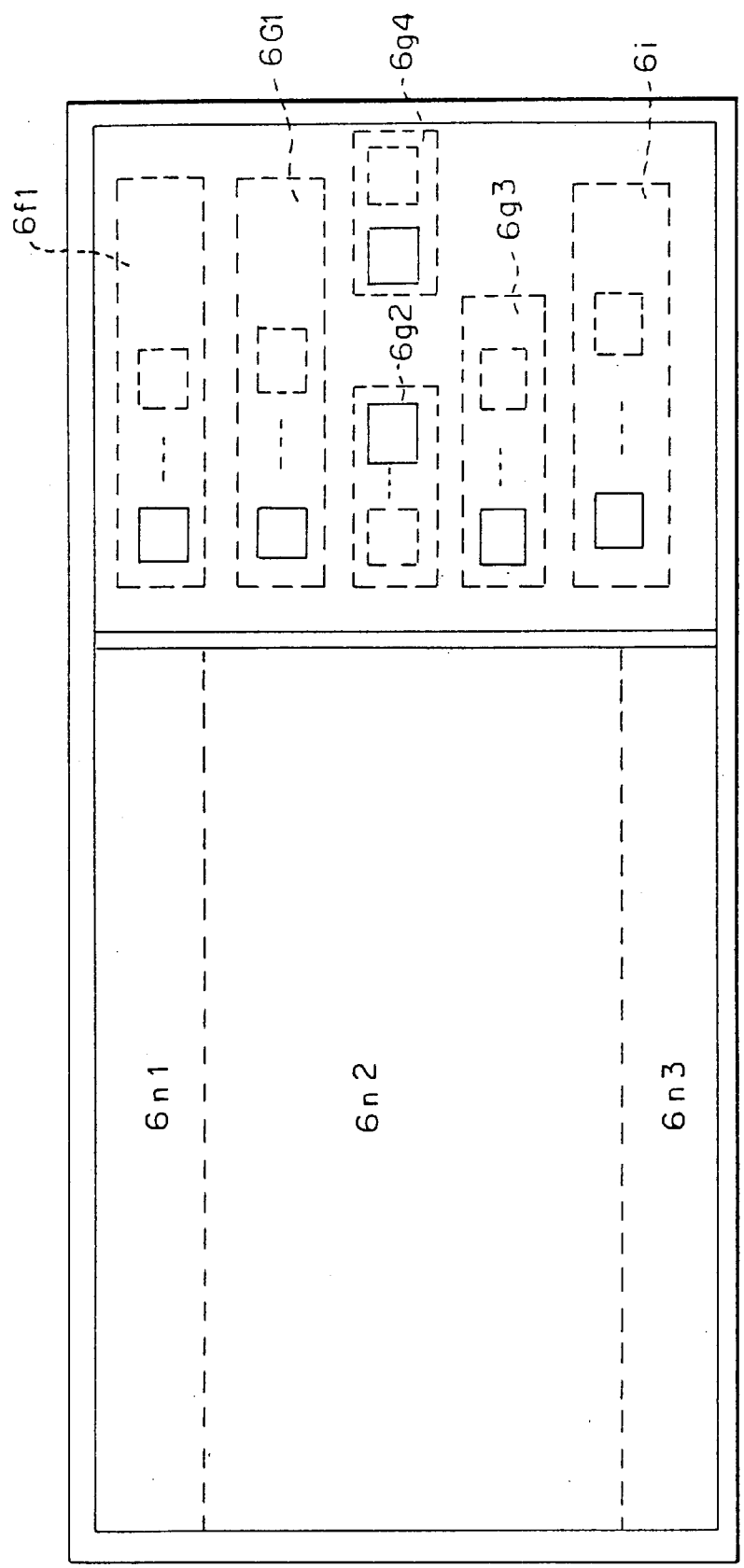

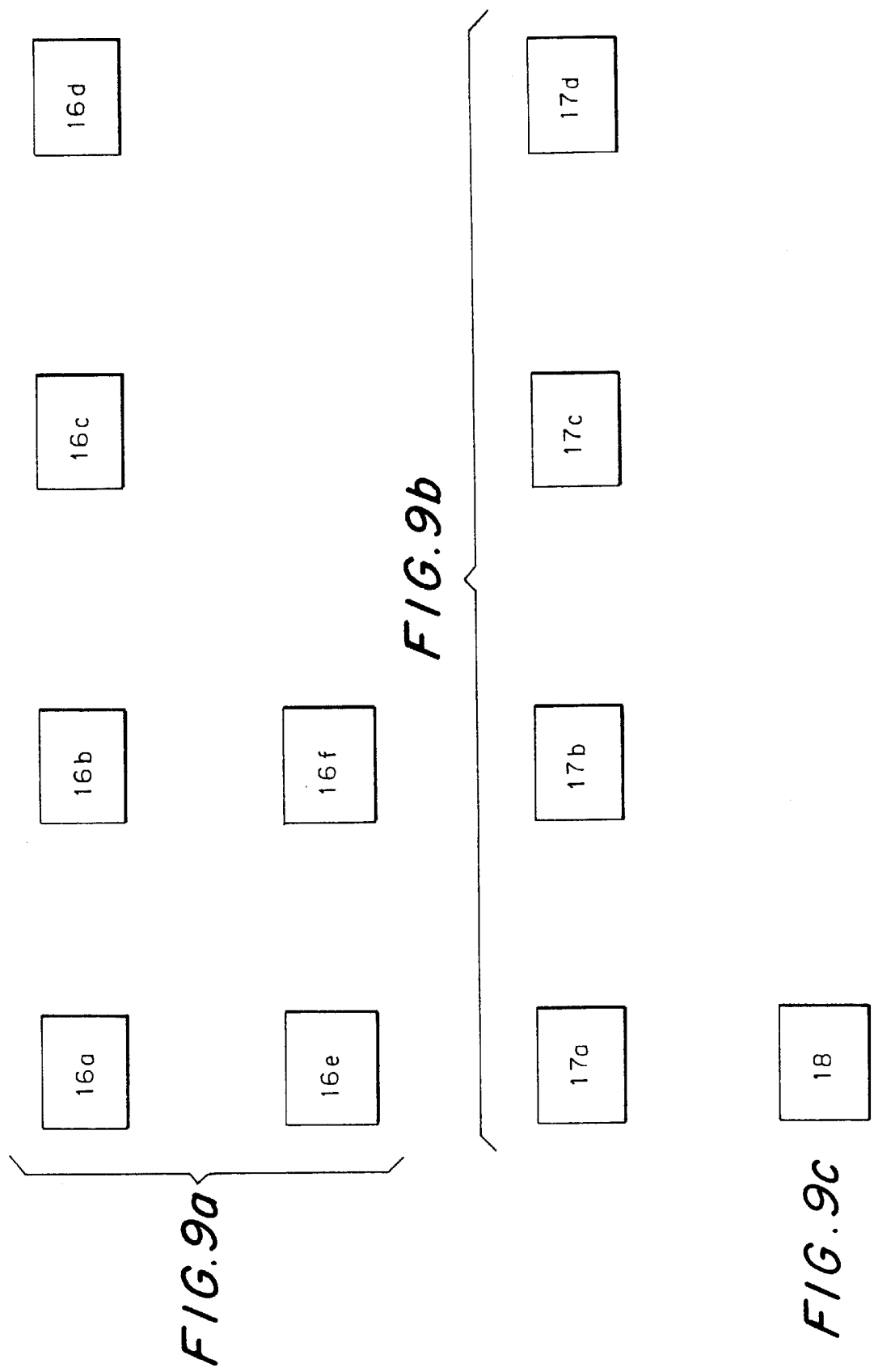

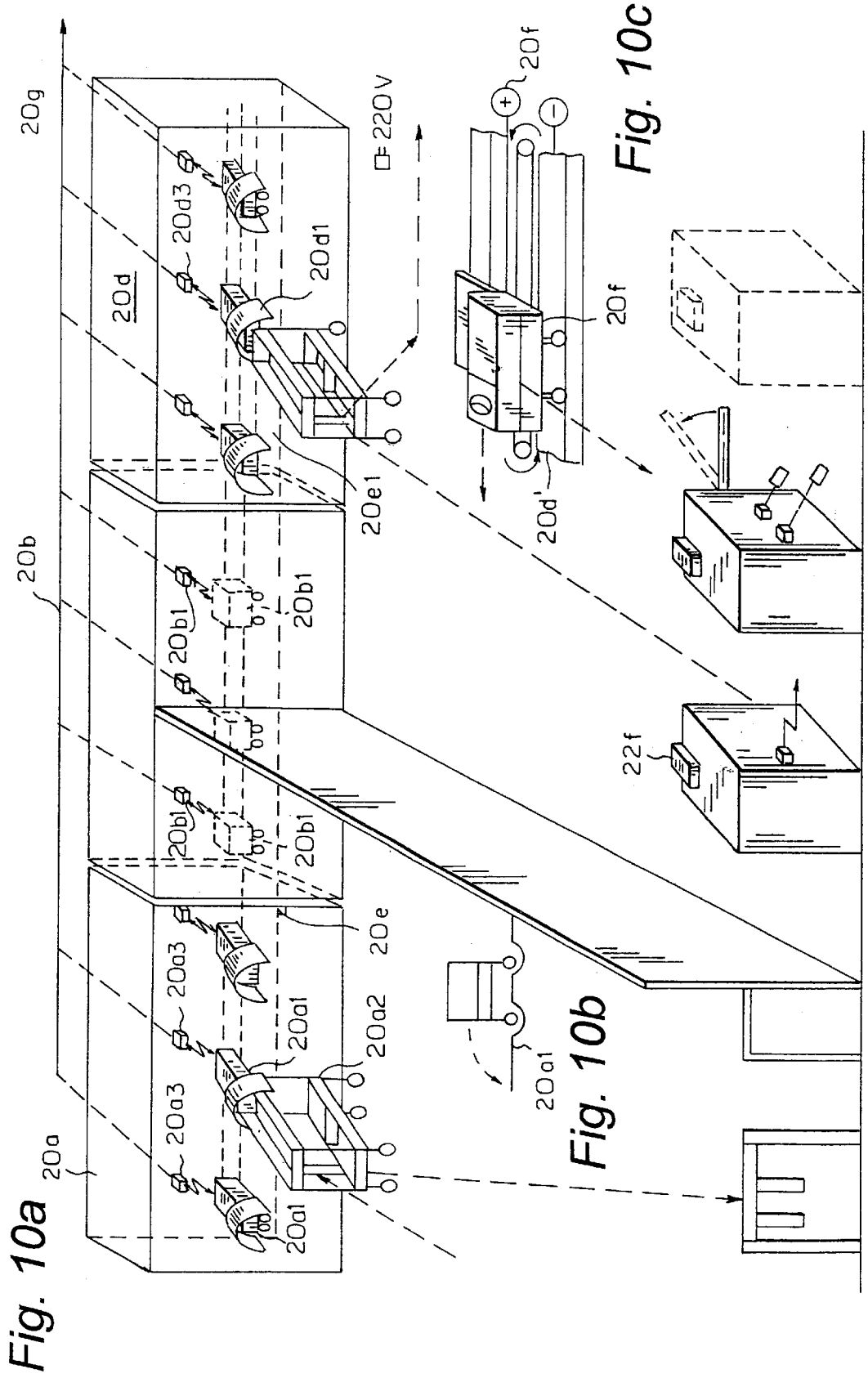

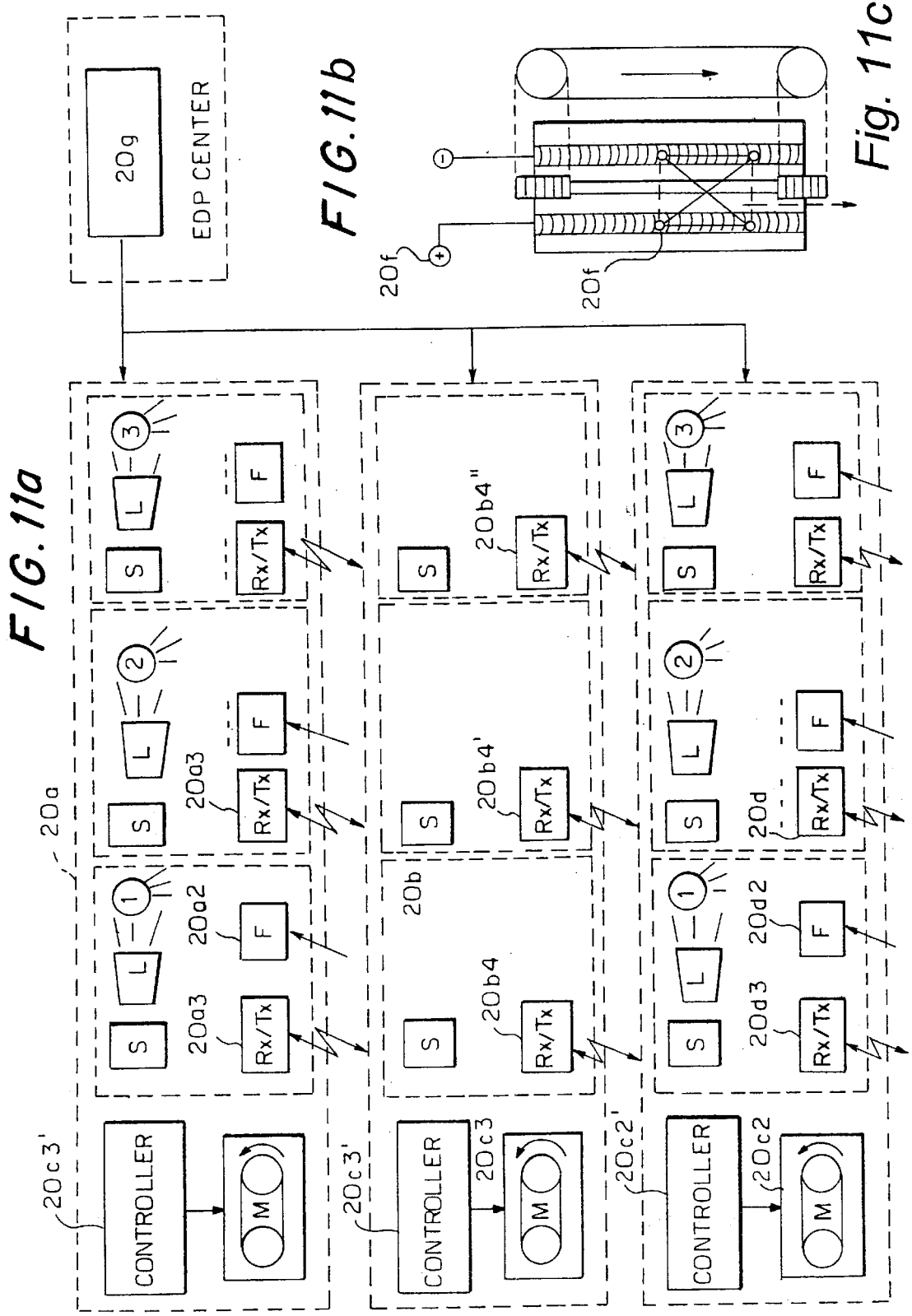

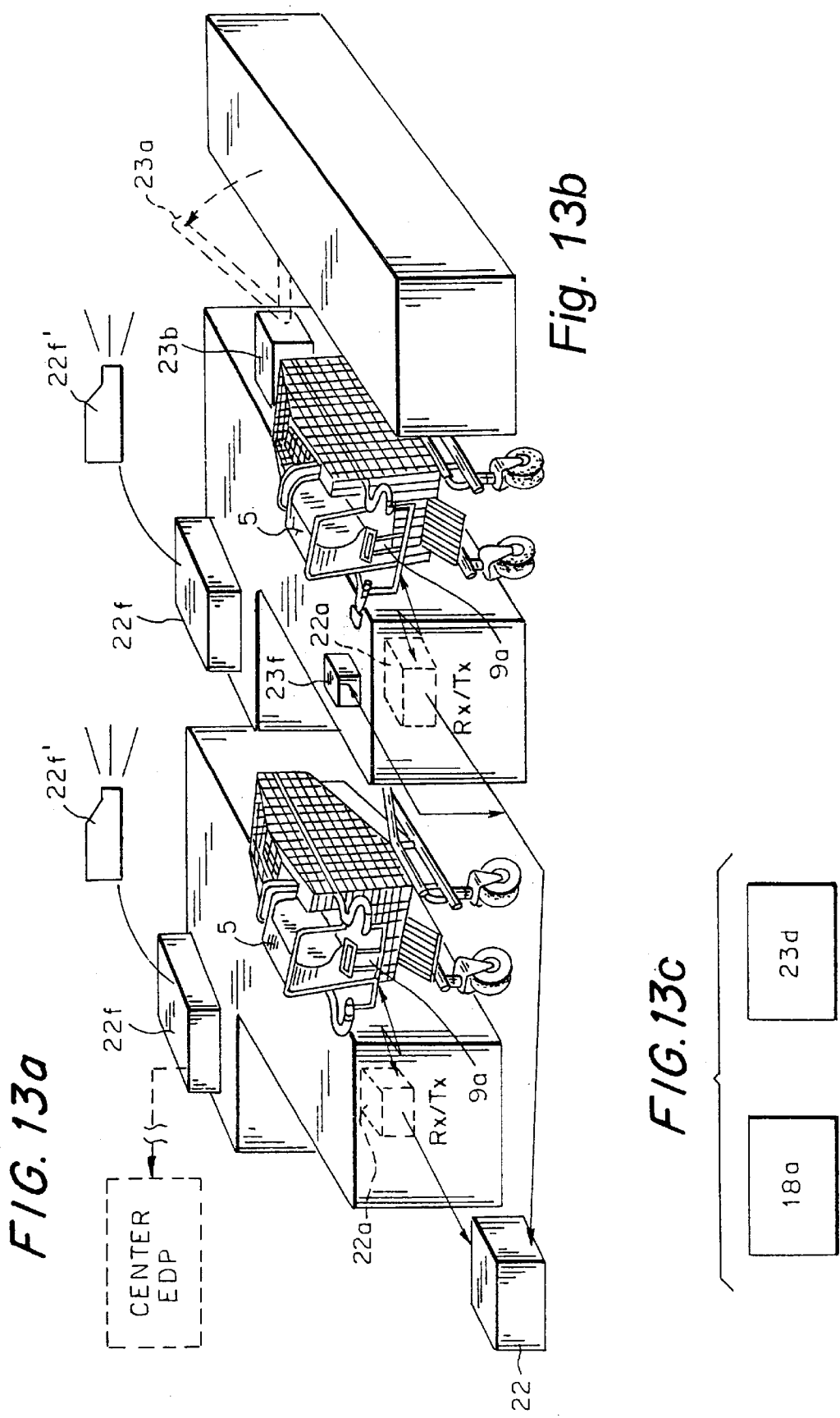

Figure 1A:
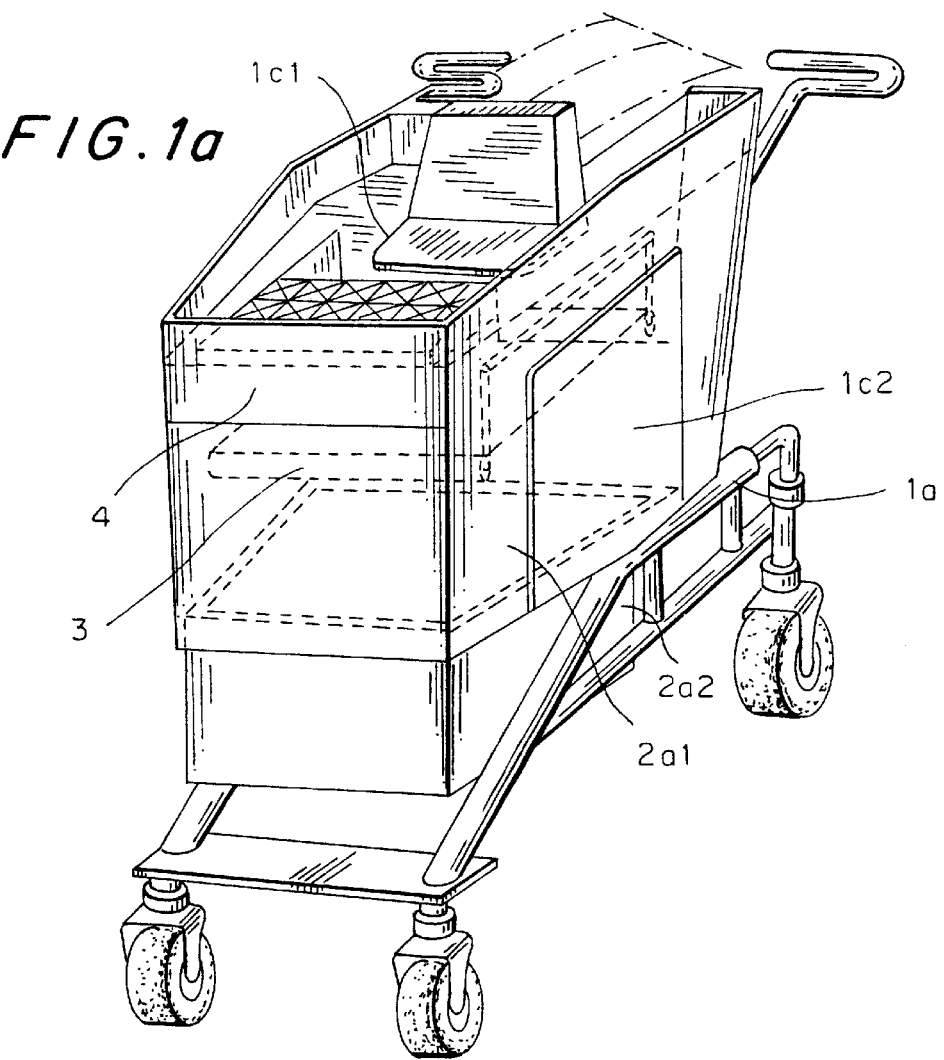

COMPUTERIZED SHOPPING CART WITH STORAGE AND DISTRIBUTION SYSTEM, FOR SUPERMARKET USE

INTRODUCTION AND FIELDS OF APPLICATION

The present invention relates to a system comprising a computerized cart and an automatic storage/distribution system.

PRIOR ART

Currently, in supermarkets, shopping information are provided with a myriad of signs and are generic (they indicate the various departments: detergents, others); the mechanical cart is used for shopping, the prices of products on sale are reported on physical tags, which oftentimes even go missing. At the cash register, all products must be removed from the cart to be counted with the manual optical scanner by the operator. Lastly, there is a form of advertising on signs aboard the cart. There is no possibility of qualifying shopping data with the consumer's characteristics (age, profession, other information) for market research purposes.

CURRENT DRAWBACKS

The current information service is scattershot, generic, and it engenders only confusion. Moreover, it is not interactive and hence it fails to meet precise requests by the customer (where is the cheese? or other requests). The result is that a synthetic presentation of the shopping scenario cannot be provided, so much so that, especially in large shopping areas, many departments remain unknown, and it is difficult to reach the desired product, or the shopper gives up on the purchase. While shopping, it is often impossible to understand the price of the product, or whether it is on sale, because there was no time to update its price tag due to the innumerable daily variations. Moreover, in order to calculate 1S the total amount as it increases, calculators are used. At the check-out counter, long queues are formed of shoppers waiting for the receipts to be issued. Lastly, the on-board commercial message is almost ineffective. The data for each shopping cart cannot be qualified with the customer's data (age, profession, other information) and hence they are not useful for the purposes of a specific market research about consumers (identifying the stereotype consumer for that product).

INVENTIVE CONCEPT OF THE INVENTION

These objects and others besides are attained by the computerized shopping cart able to be articulated into mechanical cart and computerized unit for entering products, with system for the storage and distribution thereof, with services of check-out counter queue elimination, shopping information, emission of commercial messages, real-time market research, pastimes and related auxiliary services for use in supermarkets (groceries area) characterized in that in general it comprises a closed/openable mechanical cart compartment (1) of new design for food products able to be hitched/unhitched through related electromechanical system (19) to the computerized unit for entering products (5), such as to avoid any contact with the interior environment and it checks shopping operations for correctness moreover the electronic unit (6) housed therein, comprises a computer of new design aimed at shopping problems called SHOPPING-COMPUTER (6), with related data base 6d, operating software (16) and firmware (17) for controlling the process of the related parts, in particular the mechanical cart comprises a department (1c2) for containing the inserted products, closed & openable by a related system (4) so as to be able to latch together; it comprises an automatic system (2) for varying (increasing) its internal capacity, an attenuator distributor (3) of the products as they are inserted; the insertion unit (5) comprises a manual mechanical system (5a) for inserting/ejecting the products toward the interior of the container and a series of electronic systems, i.e. the automatic system for optically scanning (7) the standard bar-codes UNIVERSAL PRODUCT CODE (UPC)/EUROPEAN ARTICLE NUMBERING (EAN), one (8) for checking the correctness of the shopping operation, one for the exchange of messages of any nature and form (9, 10, 11), one (12) for 6 emitting multimedia commercial messages, one (13) for market research, one (14) for pastimes, one (15) for power supply; one (25) controlling the removal of the insertion unit; the mechanical cart is parked free outside, whereas insertion units are distributed (at the 5 entrance) and stored (before departure) by the auxiliary automatic distribution/storage system (90); it comprises the central system (22) (data exchange via ether/shopping data concentrator, control over cash register (22f) for receipt issue, control over storage/distribution system) (20); it comprises the automatic payment (self-service) counter (23); moreover within the aboard unit it comprises the computerized map (24) of product distribution on the various shelves, aided by orientation units (position co-ordinate) installed within the commercial area, and related orientation units (position co-ordinates).

ONE EMBODIMENT AND FIGURES

Figure 1B:
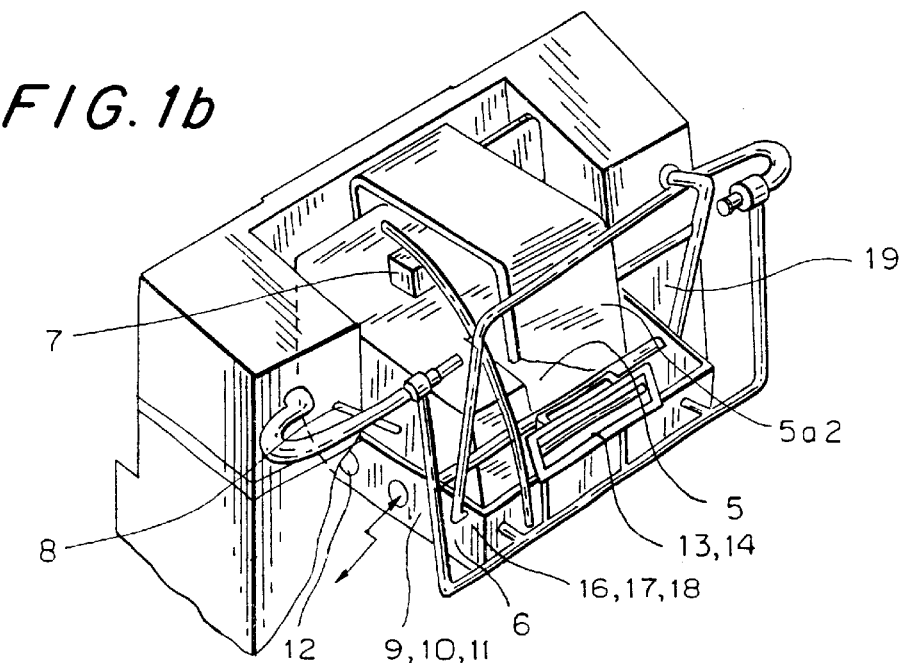
Figure 2A:
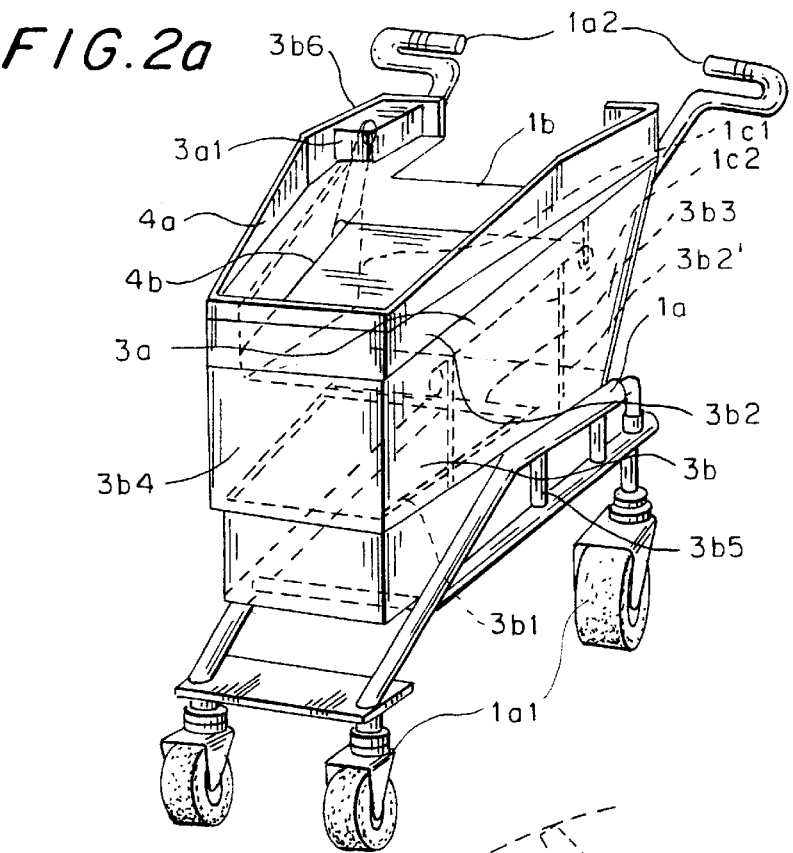
Figure 2B:
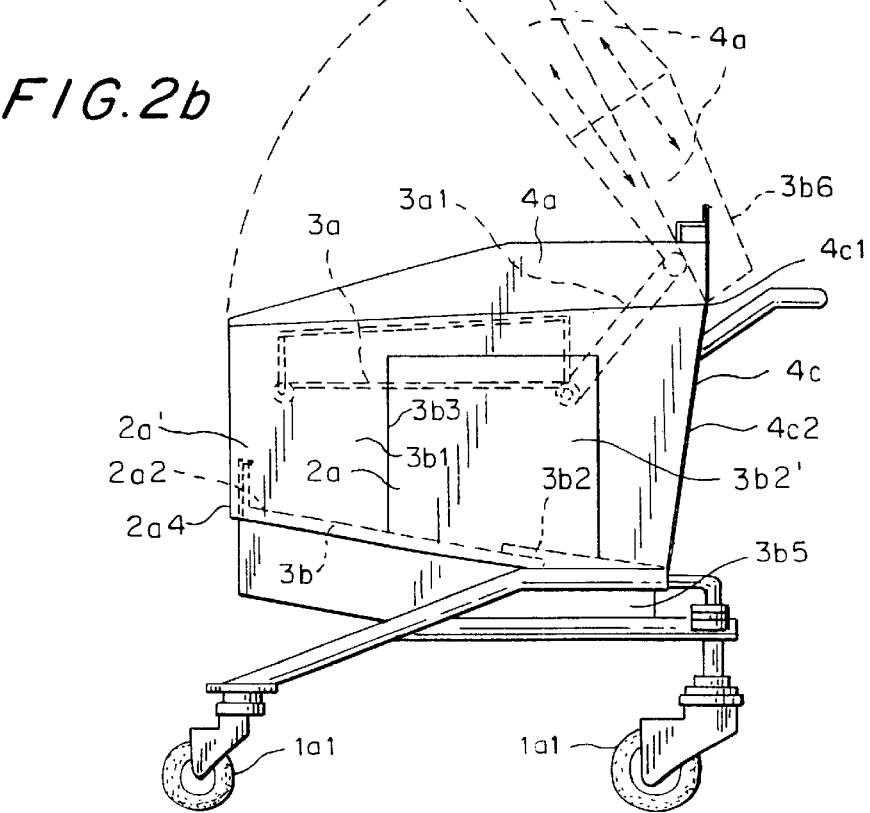
Figure 5A:
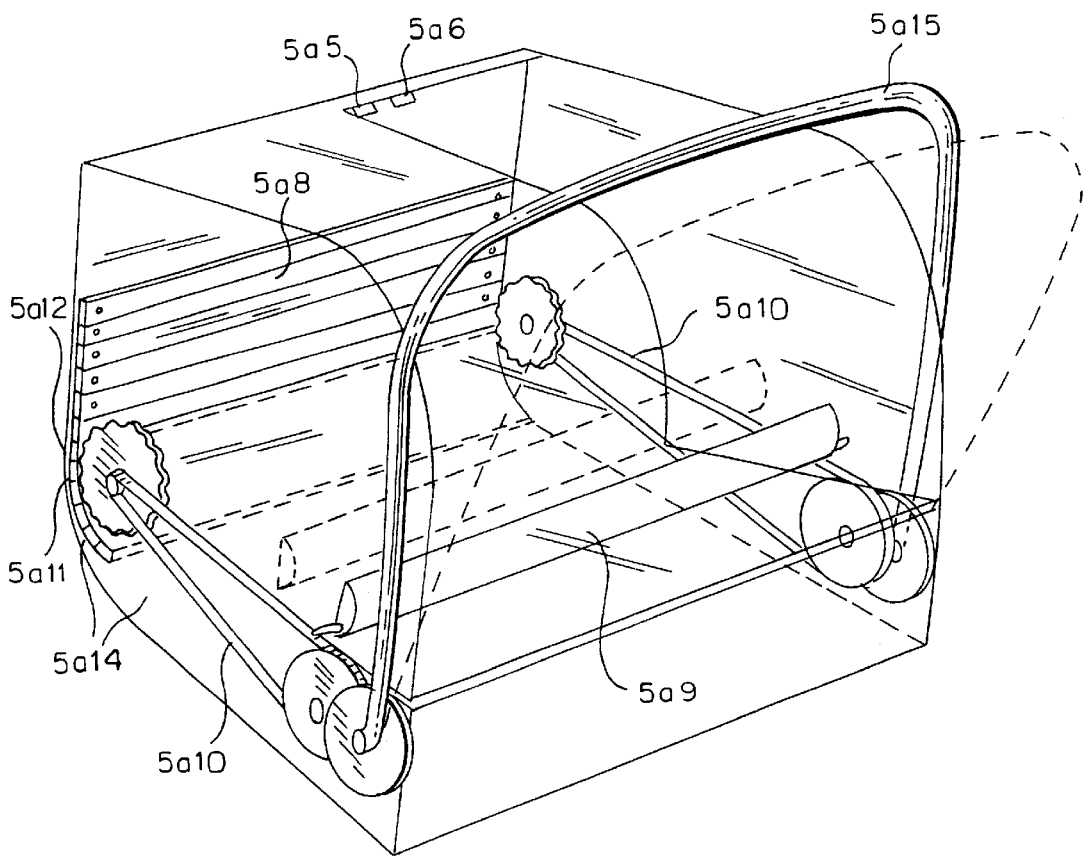
Figure 5B:
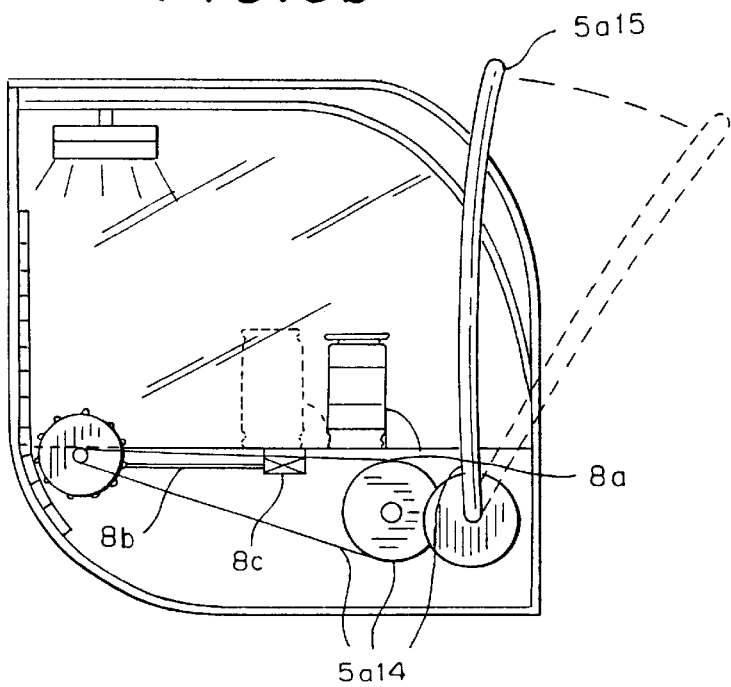
Figure 6A:
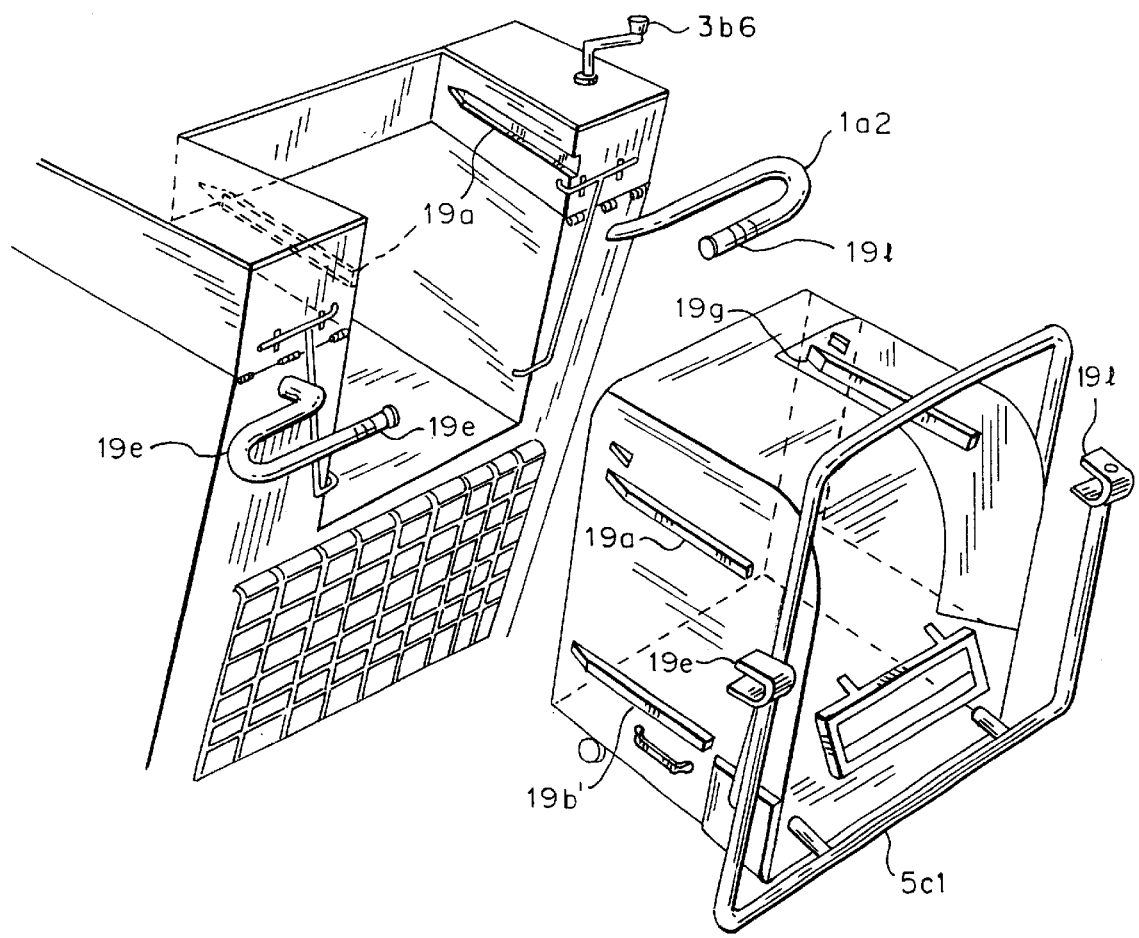
Figure 6B:
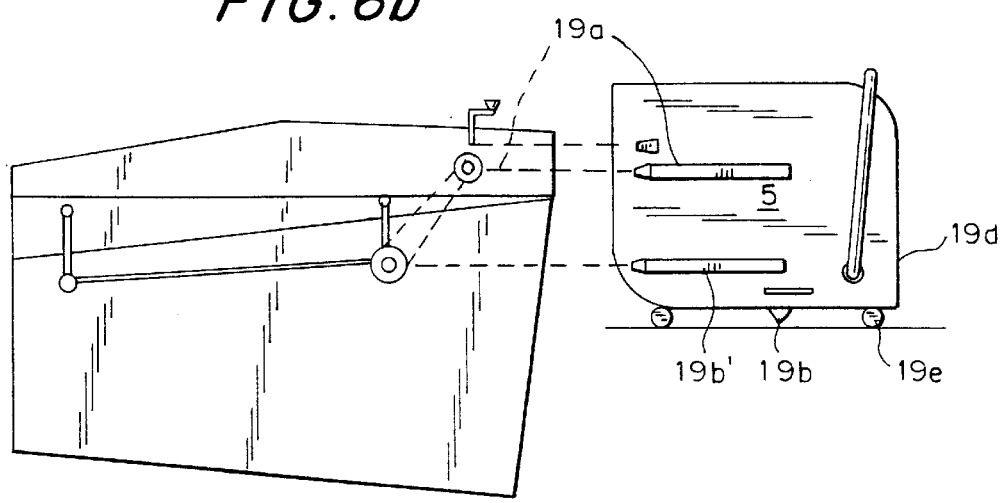
Figure 8:
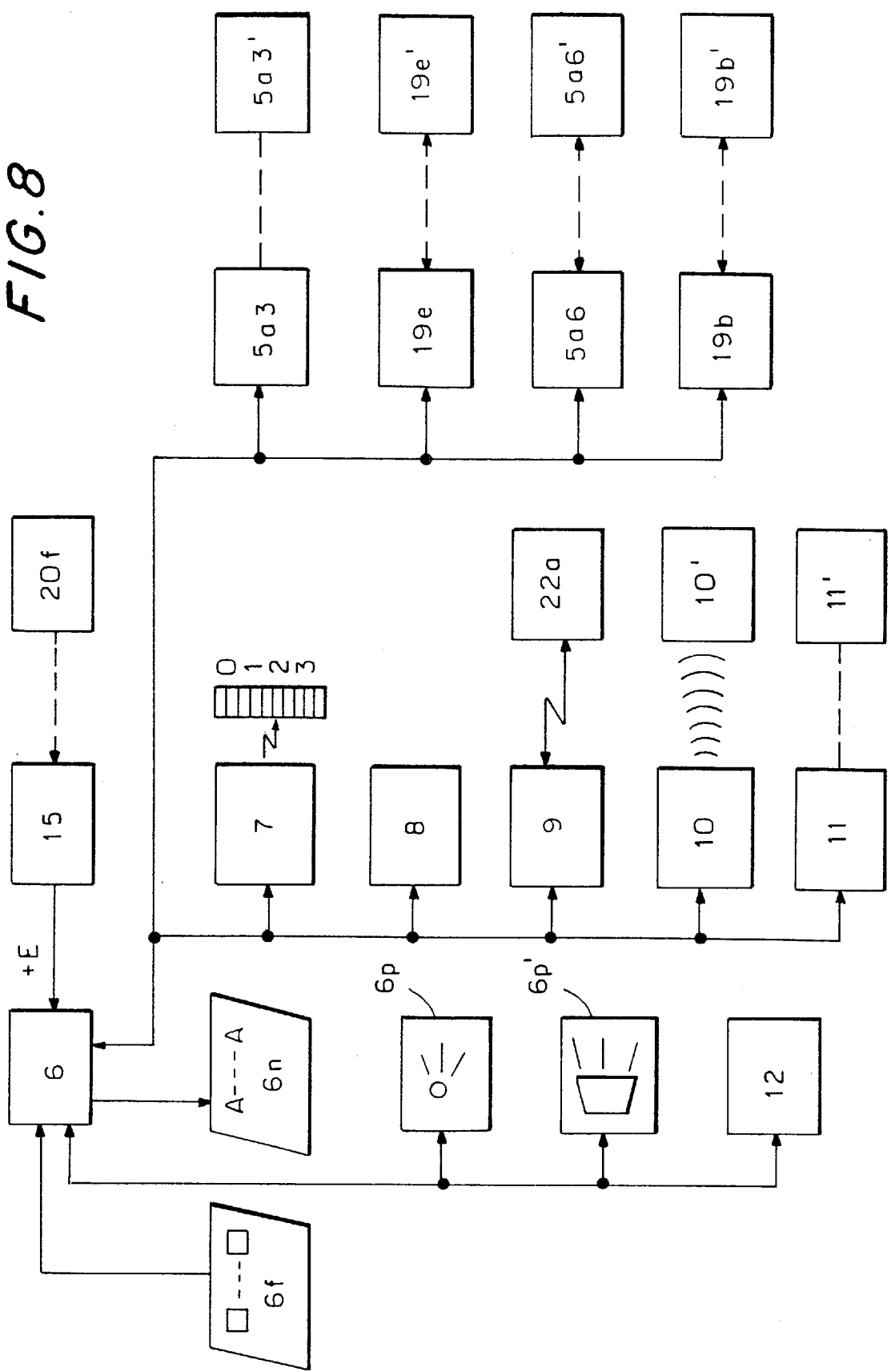
Figure 12A:
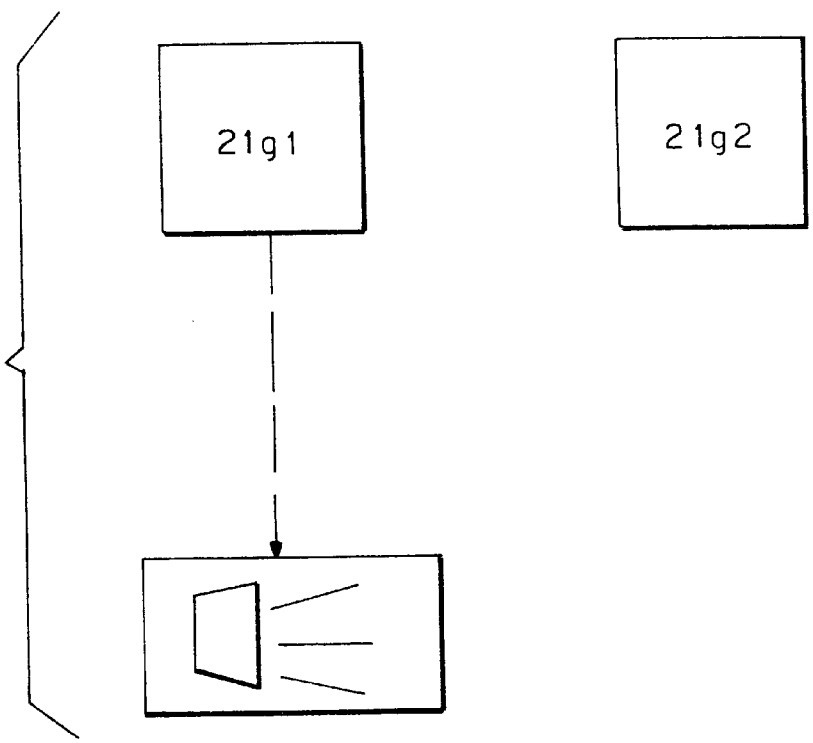
Figure 12B:
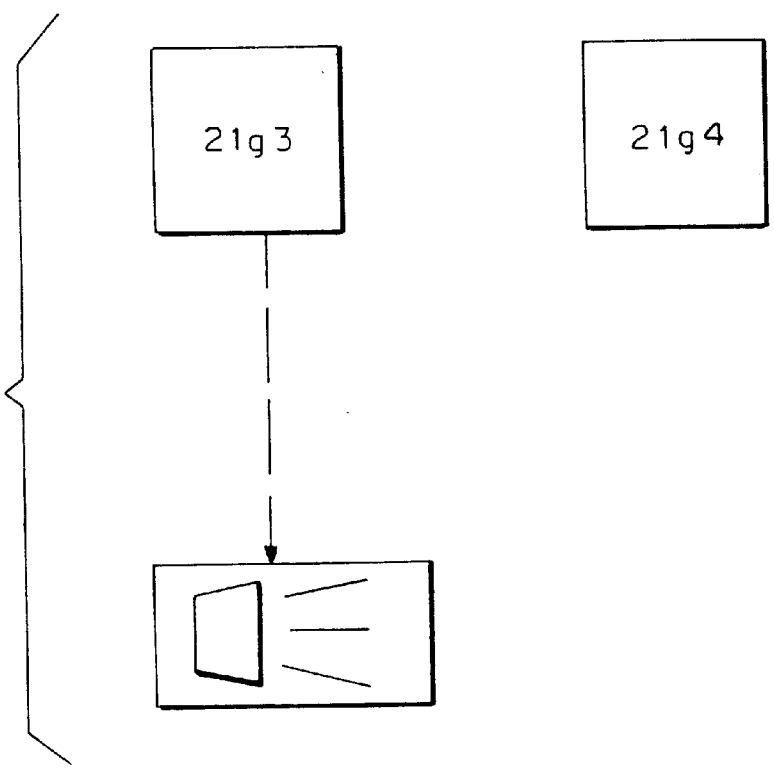
Figure 14A:
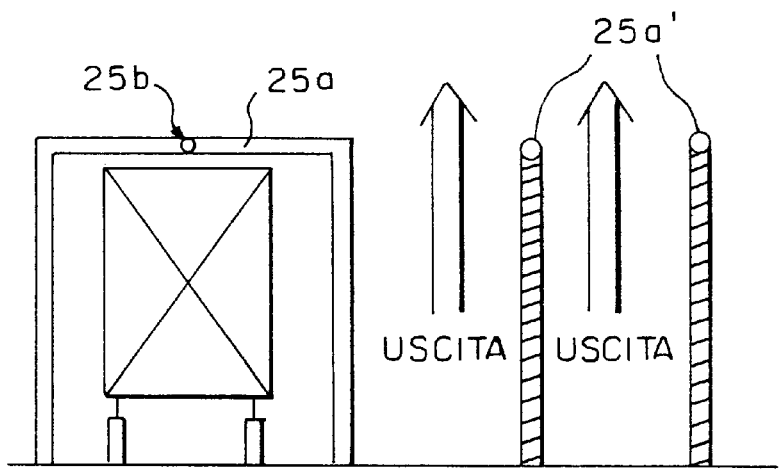
Figure 14B:
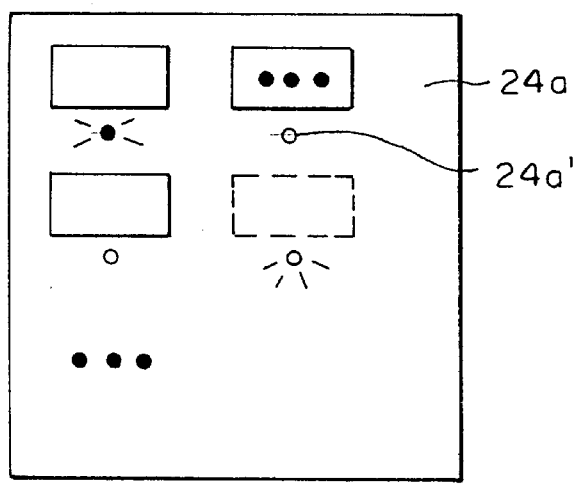
Figure 14C:
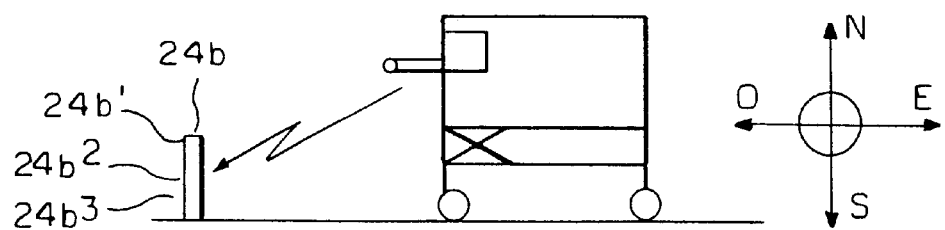

Additional characteristics and advantages of the inventions shall be made more evident by the discussions of a preferred but not exclusive embodiment of the computerized cart (SHOPPING-COMPUTER) able to be articulated into mechanical cart and electronic unit for entering products with information service, emission of commercial messages, real time market research, pastimes and related auxiliary systems for use in supermarkets (groceries area), by way of non limiting indication in the sole drawing whereof in TABLE 1—FIGS. 1a, 1b is shown the complete view of the invention from the mechanical cart and insertion unit (drive side) side, TABLE 2—FIGS. 2a, 2b is shown the overall view (distributor-attenuator, product collector, closure system, internal capacity increase system), the side view (detail of distributor/attenuator) of the mechanical cart; in TABLE 3—FIGS. 3a–3d, its top view, the side view, the opening system (product extraction), the parking mode (telescoping fit), in TABLE 4—4a–4b shows the complete view of the product insertion unit, the bar code optical scanning system (UPC/EAN standard) in TABLE 5—FIGS. 5a–5b system for product insertion/ejection and weighing system in detail TABLE 6—FIGS. 6a, 6b the latching/unlatching system to the metal cart top view side view (details); in TABLE 7—FIGS. 7a, 7b the unit for data input output to the user; in TABLE 8—FIG. 8 the complete diagram of the electronic parts of the insertion unit; in TABLE 9 FIGS. 9a–9c the programmable logic (software/firmware of the unit; moreover in TABLE 10—FIGS. 10a–10c the automatic system for the distribution (latching)/storage (unlatching) of the product insertion units is shown with details (distribution, driving, storage techniques); in TABLE 11—FIGS. 11a–11c the complete diagram of its electronic parts, the battery recharge system, the system for connection to the EDP centre; in TABLE 12—FIGS. 12a–12b the programmable logic (software) developed in the centralized system (or ground); in TABLE 13—FIGS. 13a–13c the complete view is provided both of the cart—ordinary check-out counters (with operator) and related logics developed by the on-board units; and the automatic counter (self-service 5 payment with magnetic card or other means); lastly in TABLE 14—FIGS. 14a–14b is reported the mechanical system for controlling the removal of insertion units, the computerized guide, the commercial topographic map, and orientation posts.

ANALYTICAL DESCRIPTION OF THE INVENTION AND VERSIONS

Figure 3A:
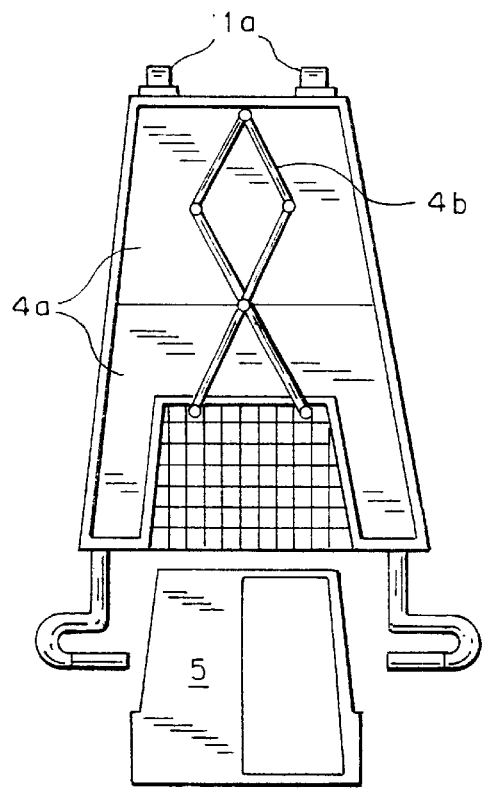
Figure 3B:
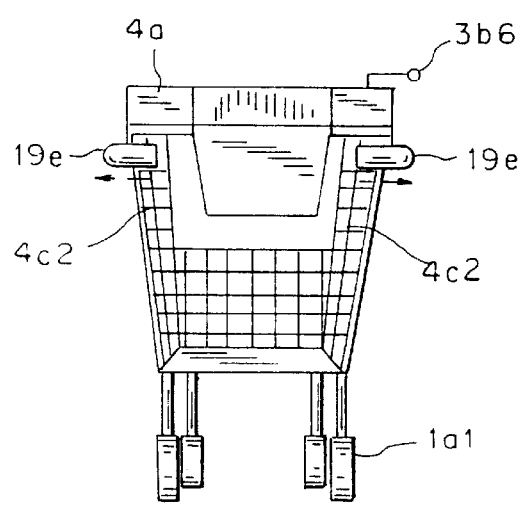
Figure 3D:
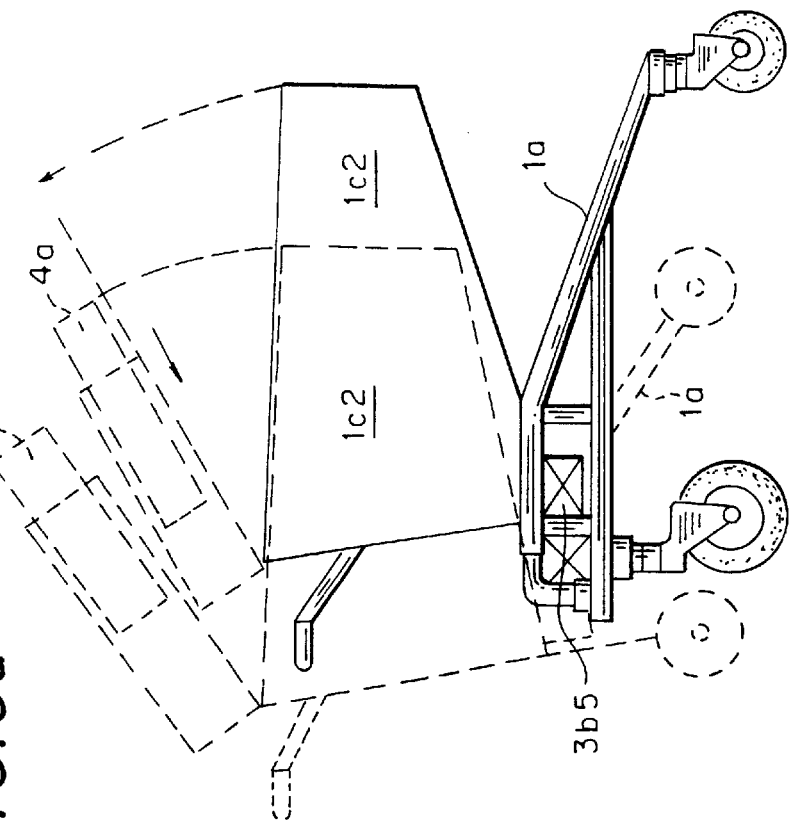
Figure 3C:
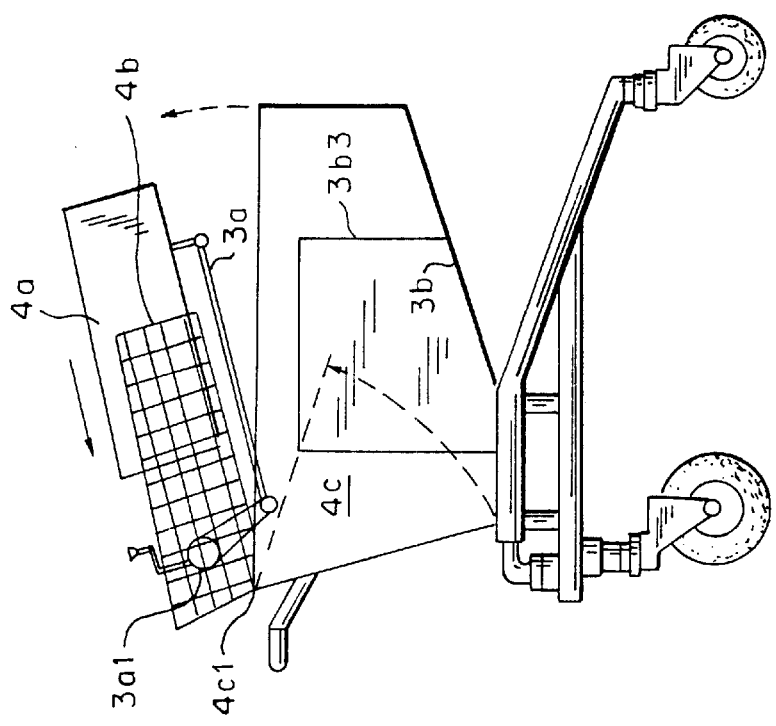
Figure 4A:
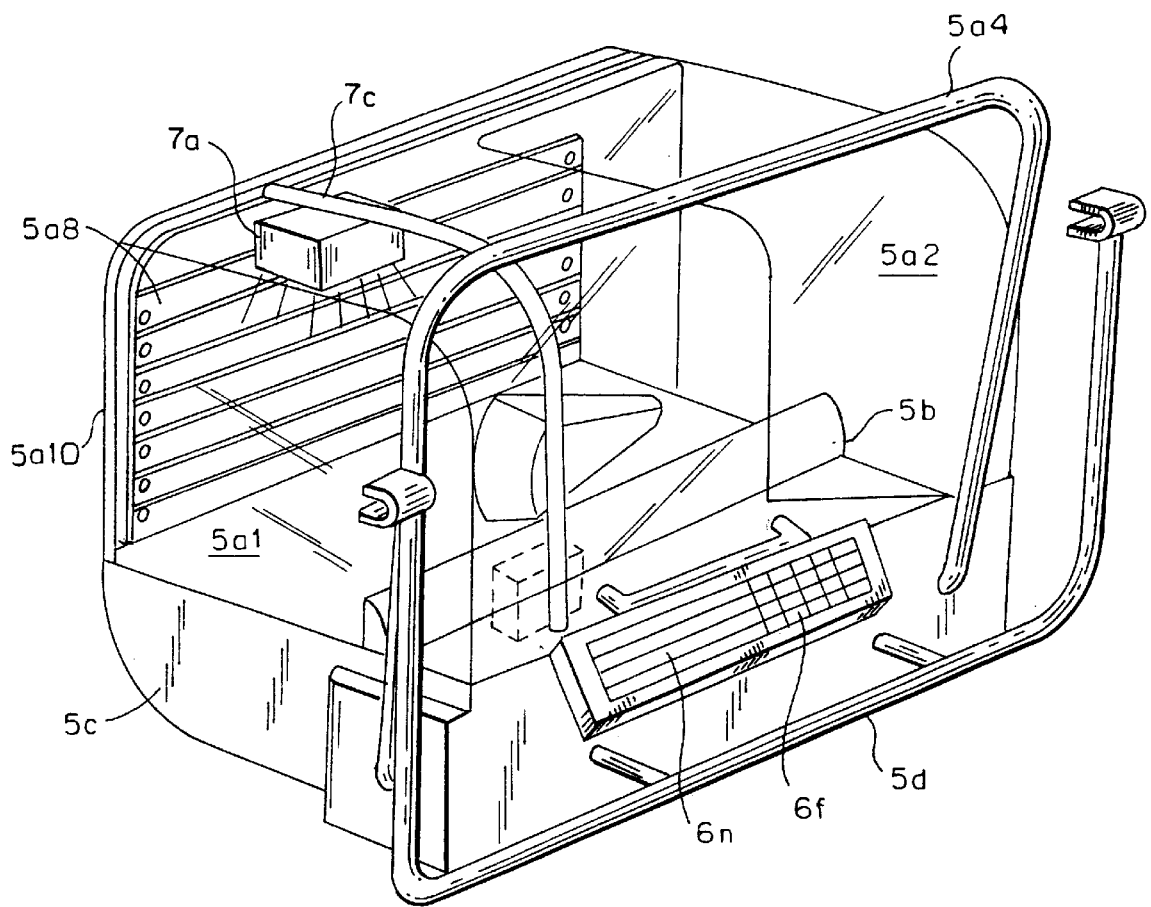
Figure 4B:
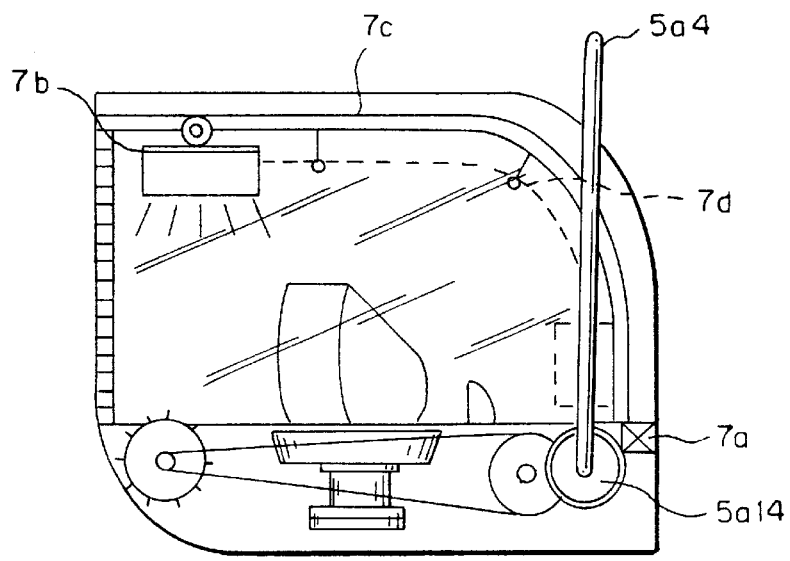

The invention shown in the drawings, as per TABLE 1, FIGS. 1a, 1b, comprises in general the movable closed 1a1 grocery container 1 (mechanical cart), connected through an electromechanical 15 latching unlatching system 19 to the unit for their insertion 5; the container comprises a system 2 for the variation (increase) of its internal capacity constituted by the base 2a conveniently movable downward; it comprises a closing/opening system 4 constituted by a pair of panels 4a conveniently connected to the structure and openable, and it comprises 20 a distribution/attenuation system 3 (product collector), constituted by the fixed plane which can conveniently be eliminated and by the movable platform 3b conveniently: the insertion unit comprises a product inlet compartment Sa1 accessible through the double doors 5a2, Sa8 which stands on the weighing plate 8a of the related system 8, whilst 25 on the upper part and along the vertical to the wall extends the automatic system 7 for reading bar codes (UPC/EAN) culminating in the related device 7a; under the base, within the closed compartment 5c, it comprises the computerized unit 6 (shopping-computer), with related operating software 16, process control firmware 17, communication software 18 and the other electronic parts: system for the exchange of 5 commands/messages in general via ether directionally 9, omnidirectionally 10, via cable 11, commercial message emission system 12, market research 13, pastimes 14, autonomous power supply 15; extremely visible are the command input unit 6f (keyboard) and the output unit (display) 6n, which together with software 16,17718 and data base 6d characterize the SHOPPING-COMPUTER of new design to manage shopping problems, in the context of the cart; lastly it comprises, to the front the grip 5d, to maneuver the cart; in particular the mechanical cart 1, as per TABLE 2 FIG. 2a comprises a base structure 1a and movable structure 1a1 bearing the closed compartment 1c2 of the internal products, surmounted by a top external one 1c1; it comprises an expansion system constituted by appropriate closures and the various sides (2a1) towards the inner walls of the main platform (3b) appropriately connected 2a3 to the vertical guides by elastic devices 2a3 such as to extend themselves automatically (internal capacity expansion) under the load of the products inserted; lastly it comprises the outer wall 2a2, which integrates the wall missing from the basket, during expansion; the system conveniently connected 3b3 to the secondary one fastened with elastic devices 3b4 to the vertical guides 3b:, and actuated by appropriate electrical devices 3b5 or other means; it comprises a longitudinal surface (product dispenser) able to be wound around the pairs of rollers 3a2 (under tension) fixed to the load bearing structure and through gears, belts, levers 3a1 to the manual control 3a2: from its side view in FIG. 2b the platform comprises the main module 3b1; moreover from the top view in TABLE 3—FIG. 3a it is seen to comprise a diverging recess on the upper part such as perfectly to fit the product insertion unit 5, at the moment of latching with the cart plus computerized unit set becoming a single compact body; it comprises the upper basket (external products) 1c1; from the drive side view of FIG. 3b, at the base one notes the motion devices 1a1, it comprises a pair of panels 4c2 to integrate the front one 4a, hinged to the load 10 bearing structure and revolving inward and upward and appropriately connected thereto and able to slide; it comprises a window which will correspond, to the outlet of the product insertion unit (when applied); a pair of appropriate devices 19a for latching and 19e for electrical contact towards the on-board system, in line with those of the grip to the product 15 insertion unit; the system for opening (product removal) as shown in FIG. 3c comprises a single structure constituted by a pair of panels 4a interconnected, able to slide, to fit within each other and hinged 4c1 to the cart itself, revolving upwards in a rest position, such as to free the entire mouth of the cart, for removal of the products (after removing the products from the upper external compartment 1c1); conversely, in the closed position when the insertion unit is applied, a series of devices assures both the unfolding 4b of the panels (cascade fitting), and a latching 19a at an angle such as to ensure the closure of the internal space (otherwise there is no hitching to the insertion unit); as shown in 25 FIG. 3d, it comprises the closure structure 4a in rest position, the platform 3b resting on the cart base, as well as the sliding base basket 2a, in line with the cart, whilst the front panel 4c rotate upward, thanks to the thrust of the front cart, as well as the supplementary panels 4c2 in recessed position as an effect of the elastic devices: in particular the computerized product insertion unit 5, as shown in TABLE 4—FIG. 5 4a comprises the product inlet compartment Sa1 whereto access is gained through the upper door 5a2 sliding on appropriate guides Sa4, upon manual command 2a2 and exit one 5a8 connected through appropriate gears, belts, levers 5a14 to the manual control 5a15e at the same time (sole control) connected to the ejection system 5b; the 10 alternative opening of the doors 5a2, Sa8 occurs with the aid of the contact sensors 5a5, Sa1 1 and of the block 5a6, Sa12; it comprises the automatic system 7 for optically scanning bar codes constituted by the optical device 7a of the UPC/EAN laser type, working capability 360 degrees with respect to label position and desired distance) which slides 15 appropriately fastened along a transverse guide 7c appropriately shaped and positioned such as to explore the entire top and side face of the food product as it enters; it comprises as its base 8a the weighing plate 8; which stands on the loading system, of the electronic weighing system; it comprises under the base a closed basket 5c wherein is housed the SHOPPING-CONfPUTER 6 along with all the other electronic parts; it comprises externally the data input/output unit 6f, 6n (keyboard/display) from user, to the SHOPPING-COMPUTER; it comprises on the front a grip 5d, whose ends are latched to that of the cart, putting in contact electrical device 5e of the on-board lighting system; it comprises under 25 the base the electromechanical latching devices 19; in particular, as shown in FIG. 4b, the automatic system for optically scanning bar codes (UPC/EAN) standard comprises the scanning device 7a fastened onto a carriage 7b latched and able to slide along a guide 7c and actuated through appropriate gears and belts 7b by motor unit 7I; or other means; moreover for the connection to the electrical power supply 15, it comprises an electrically conducting strip positioned along the guide 7c whereon the carriage stands through appropriate sliding contacts (or flying wire contained in a housing, as in the printer); in particular as in TABLE 5—FIG. 5a, in the system for inserting/ejecting an inserted product, the control device 5a12 is connected through levers gears and belts 5a14 both to the outlet door 5a8, able to slide along 5b2, and to the ejection device 5b, able to slide along the guides 5b2 so that during the travel the control Sa12 in the first section commands the opening of the outlet door 5a8 and subsequently the movement of the thrust device 5b 1; the side view of FIG. 5b shows the reversible direction of opening of the electronic rack 5c whereas the weighing system comprises the platform 8a for supporting incoming products, which stands on the electronic load detecting device 8c, appropriately fastened to the structure, driven by its intelligent unit 8d (microprocessor) interfaced toward the SHOPPING-COMPUTER; the latching system 19, as shown in TABLE 6—FIG. 6a, comprises a pair of guides 19a in line with the cart and insertion unit which has slightly converging shape in order to ease the fit; moreover, as shown in the side view in FIG. 6b, it comprises an electromechanical locking latching device 19b, fastened onto the lower part of the insertion unit 5, driven by the SHOPPING-COMPUTER, as well as a control for the safety opening; the unit for the input of users' commands towards the SHOPPING-COMPUTER, as per TABLE 7—FIG. 7a comprises various groups of function keys, i.e. one 6f1 for controlling shopping operations (cancel, consult, and others) one 6g1 to manage the menu lists of the products to be displayed (such as products for sale, consultation, purchases made, products to be 5 purchased, index of available list, and others), one 6g2 for the market research menus (such as customer survey, list of available items, and others) one 6g3 for the pastimes menus (quizzes, list of available items, and others) one 6h for displaying the desired page (move forward, move back index, and others) within the chosen list, another one 6i to select 10 the desired line within the index (up, down, right, left arrows, run, and others); the unit for data output to the users from the SHOPPING COMPUTER, as shown in FIG. 7b, comprises a dedicated area 6n1 to provide shopping information on the incoming product (purchase) (price, type, offer, provisional total amount, final total amount to be paid, and others), one 6n2 for menu info, one 6n3 for messages: the electronic parts of the insertion unit, as in TABLE 8 FIG. 8 in general comprise the processing units (SHOPPING-COMPUTER) 6, and the various control system, i.e. the product input unit 6f and output unit 6n, devices for light/sound signals 6p, 6p': it comprises the multimedia commercial message system 1Q with its unit for the electronic synthesis of the human voice (Digital Signal Processing) and graphic processing; it comprises the system 7 for electronically scanning standard (UPC/EAN) bar codes with the related laser optical scanning device 7 with omnidirectional reading characteristics (360 degrees with respect 25 to the desired label position and distance), and appropriate activation; it comprises the weight measurement system 8 with its weighing device; it comprises the contact detection system 5a3, 19 with the parts Sa3, 19' to be fastened; it comprises a fastening system 5a6, 19b toward the pivots 5a6' and 19b'; it comprises the system for the exchange of messages/commands (analogue/digital) all possible forms unidirec-tionally via ether 9 (infrared) and omnidirectional 10, via cable 11 (local/remote users) towards similar external devices; lastly it comprises an autonomous power supply system 15, appropriate movable electric contact devices toward ground battery charger 20f, connected to the national power grid; the logic developed by the programs shown in TABLE 9 in general comprises software procedures 16 of operating nature (data base, others) both process control firmware 17 (opening lock, activating motor or other actions) and software 18 for communication towards external units; in particular the former, as in FIG. 9a, comprise: general reset at start-up 16a, shopping operations management 16b, management of the product list menu 16c, market search menu 16d, pastimes menu 16e, multimedia commercial message management menu 16f; for process control, as shown in FIG. 9b, it comprises the one 17a for latching/unlatching to the metal cart, the one 17b for managing the shopping process (locking/unlocking product, insertion doors, and others) the one 17c for the optical scanning system and weighing system 17d, for communication, as shown in FIG. 9c, with the outside world, it comprises the operations 18 for the exchange of messages and commands of any nature (digital/analogue) in all possible forms: via ether omnidirectional (infrared), via cable via ether (infrared) 18a, the distribution station 20a of the insertion unit, as shown in TABLE 10—FIG. 1a comprises three positions 20a1, 20a1', 20a1" wherein stations a product insertion unit 5 oriented with the latching system 19 outward and positioned above a conveyor system 20c; each station comprises an electronic holding device 19a: driven by the unit 21 and a device 19a3 for reception and transmission via ether, driven by 5 the supermarket computer; the latching plane in FIG. 10b is shaped/inclined 20a1' to favour aerial detachment therefrom and the insertion unit comprises elastic devices for the connection towards motion device to soften the aerial detachment; the central warehouse comprises an organization in modules, each of which comprises three closed 10 compartments 20b1, 20b2, 20b3 wherein three product insertion units station in series, positioned on a conveyor system 20c1; within the individual compartments it comprises unidirectional transceiver devices 20a3 (infrared) connected to the management centre of the supermarket; moreover it is controlled by the computerized management centre 22 and 15 related software procedures 21h for driving all electronic parts; the automatic system 20c for replenishing the station by the central warehouse comprises a basic conveyor 20c1 actuated by motion units 20c2, sequential to the warehouse conveyor 20c1 actuated by other motion unit 20c2; moreover on the surface of the plane, as in FIG. 20 10c, is traced a guide to force the motion of the insertion units; the storage station 20d, the automatic unloading system 20e, the arrival base plane as in FIG. 10c, are configured similarly to those for distribution, but with inverse functions (unlatching-depositing); its electronic parts, as in TABLE 11 FIG. 11a, comprise the central management unit 22, but with the interfaces 22g to the various devices: motion, position detection (sensors), data exchange via ether (infrared), (light, sound) message/signal transmission; the battery charging system 20f of FIG. 11b, comprises a mains power supply, which through appropriate contact devices (conducting strips and conducting motion devices) connects with the autonomous on-board power supply 15: it 5 also comprises the system 20g for connection toward the remote processing centre of the supermarket as per FIG. 11c, to/from the unidirectional devices for data exchange via ether 20a3, 20b4, 20d3 (infrared) (in communication with the on-board devices) positioned in the various compartments, and an interface toward the system unit: the processing logic of the unit as per TABLE 12 FIG. 12a comprises the following procedures: management of the insertion unit—mechanical cart latching 21g1, 21g2, self-loading of the distribution station 21g2, from the central warehouse similarly, as per FIG. 12b, for the storage station comprises the unlatching procedures 21g3 and 21g4 for unloading towards the central warehouse: the cart—ordinary (with operator) check-out counter system, as in TABLE 1, —FIG. 13a, comprises infrared transceiver devices 22a positioned near the outlet base in communication with the transiting cart, and connected to the management unit 12 which in turn connects to the local cash register 22f (receipt issue); the cart-automatic payment counter (self-service) 23 as in FIG. 13b, comprises a physical barrier device 23a, actuated by a motion unit 23b, devices for the unidirectional exchange of data via ether (infrared) 23c, driven by the unit 22; the logic of the ground units, as in FIG. 13c, comprises the following procedures: one 18g to 25 manage the exchange of data between cart and ground unit, then to drive the cash register for the issue of the receipt (ordinary cash register); and one 23d to process payment as well by means of scanning unit, magnetic card or other means in order to remove the physical barrier, lastly the insertion unit removal control system, as per TABLE 14—FIG. 14a, comprises a physical barrier 25a accessible up to a certain height and 5 one 25a' accessible by the customers, comprises mechanical devices 95 appropriately fastened to the insertion unit such that if the unit is not removed, its passage through the barrier, calibrated in this sense, is prevented; moreover the system for guiding within the sales area, as per FIG. 14b comprises the map 24a of the product distribution on the various shelves within the sales area and appropriate pointers; it comprises appropriate intelligent units for orientation 24b (position indicator) located in the various points of the sales area with unidirectional transceiver devices 94b3 (infrared), towards the transiting cart, with such logic as automatically to send it the specific co-ordinate 15 of that point within the sales area.

OPERATION

The metal cart 1 is parked in the outside area, whilst the product insertion units 5 are inside within the automatic storage distribution system 20. The arriving customer draws the metal cart, enters and immediately after the entrance moves it close (drive side) to a position of the distribution station 20a for the automatic latching of the insertion unit. To facilitate this manoeuvre, the cart follows appropriate guides. Once latching is complete, an appropriate message (acoustic, visual, or 25 of other type) is sent to the customer together with a welcome message. Essentially, the ground unit 22 detects the event upon communication via ether (infrared) of the on-board unit 6 which has latched it, unlocks the holding device 20a2. Then the insertion unit performs a full self-starting operation, the main platform 3b automatically goes into shopping position (top) and an appropriate message (wishing good S shopping) informs that it is ready for shopping. Operating on the keyboard 6f, information can be requested on the products exposed (list menu: general, sales, purchased, others or about those to be purchased) or compose the shopping list thanks to a specific procedure; in general the display keys allow to examine individual pages, within a list/survey/pastimes, whilst when operating in the general list environment (index) the selection keys are used (pointing at the line with blink+run) to point and choose the desired argument (lists/survey/pastimes/desired page); to shop, it is necessary to introduce the product into the inlet compartment through the door 5a2, with its label visible upward, to the optical scanning device 7a, and positioned within a band parallel to the guide (legibility zone), during its travel and wait; the upper door 5a automatically locks, the optical scanning device advances along the guide driven by the actuator 7a until passing over the label it reads it, no matter what its angular position is; then it measures 8 its weight, it searches for the theoretical one 8 in the data base, using the label as a key and with the appropriate tolerance, it checks whether they are consistent: if so, it appropriately advises the customer to proceed with stowing the product, if not it requests to repeat the operation (invalid operation) after several attempts it gives an appropriate alarm—on each command this anonymous event is stored. For stowage, the customer presses the manual control 5a15 which causes the door 5a8 to open and the product to be ejected inside 1b. The stowed products, thanks to the internal distributor, are laid down longitudinally (x axis); when a certain quantity of products is deemed to have been stowed; upon electrical horizontal command 3b5 the base retracts, and the products are unloaded onto the platform available below: with the command a sufficient lowering thereof is set, and the distributor is re-set. The process continues cyclically in this manner until the platform, having reached the base, thanks to its load, forces the opening of the cart base. It is also possible, with appropriate incentives (prize) and respecting one's anonymity, to reply to market research questionnaires (research menus) 6g2, or activate pastimes features 6g3 (pastimes menu); while shopping, from time to time the multimedia commercial message 14 is sent (audio, video, images or by other means) at asynchronous and strategic times (after a purchase of a competing or analogous product, or at other times). At the check-out counter, upon command or automatically, the collected shopping data are transmitted to the exchange/concentration system 22 cash register 22f, which immediately issues the receipt; if there are any products on the external compartments, they are counted in the classic manner whereupon the receipt is issued. This entails the elimination of 20 check-out queues. After the cash register, the customer repeats the entry operation at a position of the storage station, to release the insertion unit. He/she then moves away outside, in the car park, with the cart filled with groceries. To remove the goods, it is sufficient to remove the closure and proceed' normally. The movable platform, after removing the products, 25 will automatically return to the base position (normal capacity) and this will allow normal telescoping parking.

CONCLUSION

The invention thus conceived can be subject to numerous modifications and variations without thereby departing from the scope of the inventive concept as defined in the claims. Moreover, all components may be replaced with technically

What is claimed is:

1. A system comprising a computerized shopping cart and an automatic auxiliary storage and distribution system, said computerized shopping cart comprising a mechanical cart and a computerized product insertion unit, said system providing services of check-out counter queue elimination, shopping information, emission of commercial messages, real time market search, pastimes and related auxiliary systems for use in supermarkets, wherein said mechanical cart comprises a closeable/openable mechanical cart compartment (1) for food products, said compartment being latchable/unlatchable to said computerized product insertion unit by means of a related electromechanical system (19)

such as to prevent any access to the compartment by a customer and wherein said computerized product insertion unit checks the correctness of the shopping operations via an electronic unit (6) housed therein, wherein said computerized product insertion unit comprises a shopping-computer (6) with a related data base (6d), operating software (16) and firmware (17) for process control of the related parts, wherein said compartment is closeable/openable by a related system (4) so as to be able to telescope one computerized shopping cart within another; wherein said computerized shopping cart further comprises an automatic system (2) for varying the internal capacity of said compartment; a distributor/attenuator (3) of the products as they are stowed; and wherein the insertion unit (5) comprises a manual mechanical system (5a) for inserting/ejecting the products toward the inside of the compartment and a series of electronic systems, comprising an automatic system for optically scanning (7) standard bar codes UNIVERSAL PRODUCT CODE (UPC)/ EUROPEAN ARTICLE NUMBERING (EAN), a system for controlling (8) the correctness of the shopping operations, a system for the exchange of data/messages (9, 10, 11), a system (12) for the emission of multimedia commercial messages, a system (13) for market surveys, a System (14) for pastimes, a system (15) for power supply, and a system (25) for controlling the removal of the insertion unit, whereby the mechanical cart can be parked free outside, whilst the insertion unit is distributed and stored by the automatic auxiliary storage and distribution system (20); wherein the automatic auxiliary storage and distribution system comprises a central system (22) for data exchange via ether/shopping data concentrator, a cash register (22f) control for issuing a receipt, a storage/distribution system control (20); the central system comprises an automatic payment counter (23), and said computerized shopping cart further including an on-board unit having a computerized map (24) of the distribution of the products on the various shelves, aided by orientation units installed within the commercial area, and related orientation units.

2. The system according to claim 1, wherein the mechanical cart (1) comprises: a load-bearing structure (1a) fastened on motion devices (1a1) with appropriate offset axis to confer maneuverability, upon appropriate manual command (102), said compartment (1c2) being transparent and being fastened to said load-bearing structure with a child seat, said compartment having a mechanical automatic expansion system that gives said compartment a variable capacity under the appropriate load of the products as they are stowed; and further wherein said automatic system comprises appropriate closures at various sides (2a1) towards inner walls of a main movable platform (3b) and related connections to vertical guides (2a3) associated with elastic elements, along which, under the load of the products, the movable platform can slide downward, causing an expansion of its internal capacity, and a rigid wall (2a2) to structure under a base of said compartment, so as to close an open side of the main movable platform during its travel.

3. The system according to claim 1 wherein the distributor/attenuator (3) of the products as they are stowed comprises: a longitudinal flexible surface (3a) appropriately subtended and encompassed at the sides by a pair of rollers (3a2) fastened to the load-bearing structure of the related system (4) and connected through gears, belts, levers (3a1) to the manual control (3a2) such as to allow its complete removal by winding at the rollers; a main platform (3b) subdivided into two independent modules including a first module connected by means of elastic devices (3b4) to a pair of vertical guides (3b3), along which said first module slides thanks to electrical or other actuation (3b5) positioned along a base, and upon appropriate command (3b6) when the product insertion unit is applied with its power supply, and a second module connected thereto (3b3) in such a way that its downward travel is limited to the base, whereby the former descends lower activating the expansion system whilst it is driven upward by the first module.

4. The system according to claim 1 wherein the related system cart (4) comprises: a pair of panels (4a) interconnected, slidable, and fitting together, hinged on one side, to a load-bearing structure at the drive side of the cart, said panels having such shape that, in an open position, they comprise an open upper compartment (1c1) in the manner of a basket; an extension device (4b) interconnected between the two panels such that, under the thrust of the insertion unit, when applied, the extension device forces the two panels to open; guiding devices (19a) such that, in line with corresponding ones on the insertion unit, when it is latched, the panels are forced to unfold according to such an angle as to ensure the full closure of the mouth of the cart; a front panel (4c) hinged on both sides, to the cart structure, by hinges such as to assume a longitudinal rotation inward and upward, wherein the hinges are fastened at a height such that under the thrust of the insertion unit when it is applied through a window obtained thereon, it is forced, tends to rotate outward in the closed position; and a pair of supplementary panels (4c2), connected and able to slide on the front panel (4c), such that, when the insertion unit is applied, as an effect of appropriate protuberances (5g1) they unfold until closing side slots of the front panel itself.

5. The system according to claim 1, wherein the related system for telescoping carts in one another for parking comprises: an upper closure structure movable into a retracted position, appropriately rotatable into an oblique position and supported by a stop device (4d); a front panel (4c) rotatable inwardly to slightly more than a horizontal position, diverging upwardly; a main platform (3b) in a rest position at the level of a base, realigned by elastic devices, when the load of the products is removed so as to ensure an appropriately converging shape of the inner compartment, and a diverging shape of the lower load-bearing structure, such as to allow a cascade telescoping fit of multiple mechanical carts, for inner compartment parts, with the superposition of lower parts (2a2) and those of upper parts.

6. The system according to claim 1, wherein the product insertion unit (5) comprises: a closed compartment (5a1) accessible for product insertion through an upper door (5a9) able to slide on appropriate guides (5a4) upon manual command (5a2) and with exit for product ejection through a second door (5a8) able to slid on appropriate guides (5a10), connected through gears, belts and levers (5a14) to a manual command (5a2), thanks to appropriate contact (5a5) (5a11) and fastening (5a6) (5a12) sensors applied thereon, whereby the doors operate in such a way that they are never open simultaneously; an ejection device (5b) positioned longitudinally at the level of a base surface, fastened to the two ends on appropriate guides (5b2) to allow a motion to the second door, wherein said product insertion unit is connected by means of belts, gears, levers (5ap4) to a sole manual command (5a2g) which simultaneously drives both the second door (5a8) and the ejection device (5b) for incoming products.

7. The system according to claim 1, wherein said shopping computer comprises a structure oriented towards solving shopping problems inside a supermarket, said shopping computer comprising: a data base (6d) about the products on sale, both with commercial data, such as price, product, description, and other s, and process data, such as product type, weight, or other; processing (1c) oriented to the management of the various shopping problems, such a s managing the shopping operation, the menu with the market research to be activated and its execution, whilst respecting anonymity, managing the menu with the pastimes to be activated and their execution; a process-related processing (circa 17) for emission of multimedia and intelligent commercial messages (12), the latching/unlatching operations with the mechanical cart, of the system (7) for optically scanning bar codes and weighing (8); processing (18) f or the exchange of messages of digital/analogue nature, through wireless, cable as channel, and means of transmission towards various external units of the RX/TX type positioned at a cash register of a management unit, towards position indication units and communication protocol; a unit (6f) for the input of user commands, keyboard of the functional type, organized into groups dedicated, respectively, to: (6f1) controlling the shopping operation, a product list menu to be displayed, (6g2) a market research menu to be activated, (6g3) a pastimes menu to be activated, (6g4) control of a page to be displayed, and (6i) selection of a line to be activated; a data or graphics display unit (6n) having an area dedicated to information (6n) about an on-going shopping operation, an area (6n2) to the activated info menu, and an area for interactive messages with duplication of sound messages for the hearing impaired to guide the customer through the operations.

8. The system according to claim 1, wherein the system for optically scanning (7) comprises: a device (7a) for optically scanning bar codes with the ability to work both at 360 degrees with respect to the angular position of a label with the bar code of a product, and at a desired distance; a carriage (7b) to which said device is fastened and which is connected by means of appropriate devices to a guide (7c) along which the carriage slides, said carriage is of appropriate shape to cross an entire upper surface and a vertical portion of the insertion unit, whereto it is appropriately fastened; in such a way as to allow to the optical scanning device (7a), during the motion, an entire exploration of the product inserted along the upper surface and a vertical face, wherein said carriage is connected through appropriate gears and belts (7d) to an electrical actuation unit (7e); an electrical connection for connecting the device for optically scanning bar codes to an electrical power supply (15), said electrical connection comprising an appropriate flying wire fixed so as not to interfere with the motion of the carriage itself collected by appropriate compartments as in printers or with electrical strips traced along the guide itself.

9. The system according to claim 1, wherein the system (8) for controlling the correctness of the shopping operations, such as the count of all products inserted in the insertion unit, comprises: an electronic system for measuring weight (8) constituted by a load detection device (8c), positioned under a base (8a), appropriately fastened to a structure and driven by the electronic system; in the data base (6d) appropriate information about product characteristics and a processing logic (16, 17) able to verify the consistency between the theoretical weight of the products identified by scanning their label, thanks to the system (7) for optically scanning and then monetarised, and the load present on a weighing plate, as well as the management of related messages in case of unauthorized or unidentified products.

10. The system according to claim 1, wherein the system (8) for controlling the correctness of the shopping operations comprises both a logic (16) developed by the on-board unit, able to record any event during shopping operations, such as attempts to insert unauthorized products, strange shopping list and so on, giving appropriate indications on the output unit to security personnel, for a quick, focused check on outgoing carts.

11. The system according to claim 1, wherein the on-board system (9) for the exchange of commands/messages comprises appropriate transceiver units connected to the on-board unit (6) able to operate with messages of digital/analogue nature, through any channel, both via wireless (9) (10), and via cable (11) and of any transmission technique, be it PCM, FM, FSK, both bidirectional (9) and unidirectional (10).

12. The system according to claim 1, wherein the system (12) for emitting multimedia commercial messages comprises: a digital signal processing unit (12a) for the electronic synthesis of the human voice and a device for storing and reproducing sound messages or images connected to the on-board unit (6); and a processing logic (12c) able to control various events, to determine an "intelligent" time for releasing a commercial message when a product competing with the sponsor's is inserted, or recalling the sponsored one, or other situations.

13. The system according to claim 1, wherein the system (14) for pastimes comprises: a series of multiple choice surveys about a client whilst respecting the client's anonymity, about a product, others, and a general list of available pastimes; a software management logic (13b) developed by the on-board unit able to perform the selection and activation of one of them; a group (6g3) of functional commands on a data entry unit, dedicated to the management of a market research/pastime menu; and a dedicated area (6n2) on an output unit for displaying research questionnaires/pastimes.

14. The system according to claim 1, wherein the related electromechanical system (19) comprises: on a front side of the cart, a pair of appropriate guides (19a) within which are invited corresponding devices on the insertion unit, during a coupling phase; a grip (5c1) rigidly fastened to the insertion unit and having ends provided with cavities such as to invite the ends of those (1a2) fastened to the structure of the cart, so as to unload all the stress of their own weight on the structure of the cart; a series of devices (19e) both on the cart and on the insertion unit such that once joined, electrical contact therebetween is assured, i.e. electrical continuity between an electric lighting system (1c3) vitality indication toward the electrical power supply of the insertion unit; under a base of an electronic container rack (5c) an appropriate fastening device (19b) and contact sensors (19f), such that, when activated it comprises a pair of appropriate lateral protuberances (5g) such that, in the latching phase, they unfold integrating panels (4c2) in such a way as to close lateral vertical slots at the sides of a front panel (4c) necessary for its rotation; a thrust device (5g2) fastened in front of the insertion unit, such that, in a junction phase, the thrust device forcedly activates the unfolding of the related system (4), and moving according to a set angular position, thanks to appropriate longitudinal latching devices it covers the entire upper mouth of the mechanical cart in a rigid manner for a cascade fitting sequence; a volumetric shape of the insertion unit and slightly convergent towards an invitation compartment (diverging) obtained on the closure structure, such as to facilitate their junction by contact between small area point towards larger invitation.

15. The system according to claim 1, wherein the auxiliary storage and distribution system (20) comprises: at an entry a distribution station for latching (20a); a central warehouse (20*b*); a storage station for unlatching before exiting (20*c*), wherein the distribution station (20*a*) comprises three positions (20*a*1, 20*a*1', 20*a*1") for latching to respective stored insertion units, appropriately pre-set and positioned above a conveyor system (20*c*1), each station comprises an electronic holding device (20*a*2) one of wireless transmission and reception (20*a*3), driven by the central system (22) only one for the auxiliary systems, the central warehouse is modular (20*b*) and comprises various modules, each with enclosed compartments (20*b*1, 20*b*2, 20*b*3), wherein the units (6) station, positioned on a conveyor system contiguous to the first (20*c*3), in each van are positioned devices (20*b*4) for the reception and transmission of unidirectional infrared data also connected to a central unit (22*f*), which comprises software (21) necessary to drive all electronic parts; an automatic system for replenishing the distribution station (20*a*) at the expense of the central warehouse, constituted by the conveyor system (20*c*1) actuated by motion units (20*c*2), wherein a support plane is appropriately shaped (inclined at the edges (20*a*1'), whilst the motion devices of the product insertion unit are connected through damping elements in order to soften the latching/detaching phase; moreover along the track are placed longitudinal guides to impart a longitudinal motion to the devices of the units; an exit storage station (20*d*) configured in the same way as the distribution station, but with inverse functions; for the electronic part, it comprises the data base and the central system (22) connected, through an interface, with various devices providing motion, position detection sensors, wireless data exchange, transmission of messages/signals; a battery charging system (20*f*) constituted by a mains power supply (20*f*), connected through movable contact devices (15*a*) with the system (15) for power supply; a connection system (20*g*) to a remote managing computer of a supermarket; devices for the wireless infrared exchange of unidirectional data, positioned in the compartments, connected to the system unit, wherein the software (21) comprises management software for the following operations: latching (21*g*1) distributing station, unlatching (21*g*2) latching station, activation of the replenishment of the distribution station (21*g*3), depletion of the storage station.

16. The system according to claim 1, wherein the automatic payment counter for self-service (23) comprises: a physical barrier (23*a*) moved by actuation units (23*b*); a system for the wireless infrared exchange of unidirectional data (23*c*); a remote data display (23*c*); a reader (23*f*) of magnetic cards, credit cards or other means, connected to a central management unit (21); and a processing logic (23*d*) able to manage a related payment and the removal of the barrier only when payment been completed.

17. The system according to claim 1, wherein the automatic auxiliary storage and distribution system includes an ordinary cash register with operator and the cart comprises: unidirectional devices for wireless transmission and reception connected (29*a*) to a management unit, to the cash register (22*f*); and programming logic (23*d*) able to manage the exchange of data with the cart and the issuance of a receipt.

18. The system according to claim 1, wherein the central system comprises: on the insertion unit within the data base (22*c*), a virtual map (25*a*) of the distribution of shelves in a sales area and that of the goods thereon, integrated with appropriate pointers for the position of the cart and of a shelf with a desired product; a processing logic able to identify on the virtual map both the shelf where the product desired by the customer is located, and the position of the within the sales area, this thanks to a series of intelligent orientation units (24*b*) installed in various point of the sales area, which transmit to the unit of the cart the co-ordinates of the position of the cart.

19. The system according to claim 1, further comprising a control system (25) for the removal of the product insertion unit (before exiting), wherein the control system comprises: a physical barrier (25*a*) towards an exit, positioned at a certain height; and mechanical devices (25*b*) fastened on the insertion unit in such a position that, if they are not removed, passage of the entire cart past the barrier is prevented.

\* \* \* \* \*